United States Patent [19]

Ono et al.

[11] 3,997,314
[45] Dec. 14, 1976

[54] PROCESS AND APPARATUS FOR MANUFACTURING A WIRE REINFORCED FLOAT GLASS

[75] Inventors: Shigeo Ono, Kanagawa; Takao Terakado, Tokyo, both of Japan

[73] Assignee: Asahi Glass Co., Ltd., Tokyo, Japan

[22] Filed: Feb. 19, 1976

[21] Appl. No.: 659,532

[30] Foreign Application Priority Data

Feb. 28, 1975   Japan ................................ 50-24037

[52] U.S. Cl. ..................... 65/51; 65/99 A; 65/147; 65/182 R
[51] Int. Cl.² ........................................ C03B 18/02
[58] Field of Search ............... 65/65 A, 99 A, 147, 65/149, 182 R, 51, 52

[56] References Cited
UNITED STATES PATENTS

| | | | |
|---|---|---|---|
| 3,305,335 | 2/1967 | Jewell et al. | 65/149 X |
| 3,558,294 | 1/1971 | Tovvay | 65/147 X |
| 3,575,789 | 4/1971 | Siefert et al. | 65/52 X |
| 3,582,302 | 6/1971 | Kita et al. | 65/182 R X |
| 3,721,543 | 3/1973 | Classen et al. | 65/182 R X |

*Primary Examiner*—Arthur D. Kellogg
*Attorney, Agent, or Firm*—Oblon, Fisher, Spivak, McClelland & Maier

[57] ABSTRACT

Reinforced float glass is produced by forming a glass ribbon on a molten metal bath, imparting a predetermined thickness to the glass ribbon and thereafter cooling the glass ribbon down to a temperature not higher than about 800° C in order not to allow a metal wire to sink, superposing the metal wire and a molten glass having a temperature more than about 1000° C onto the glass ribbon, thereby forming a laminated glass ribbon embedded with the metal wire, and further advancing the laminated glass ribbon along the molten metal bath to flatten the upper surface thereof.

6 Claims, 3 Drawing Figures

U.S. Patent     Dec. 14, 1976     3,997,314
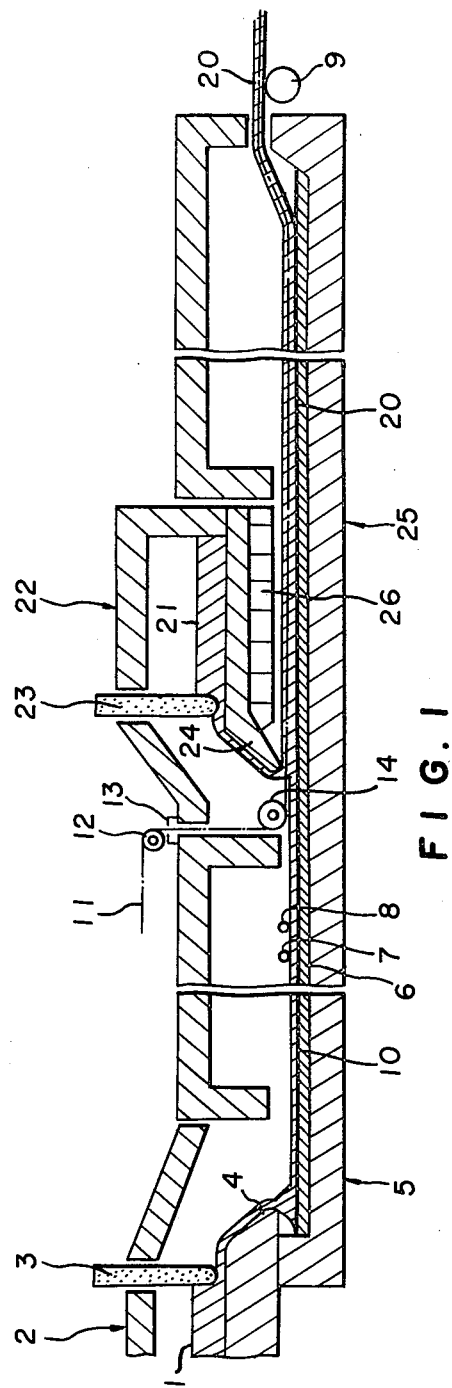
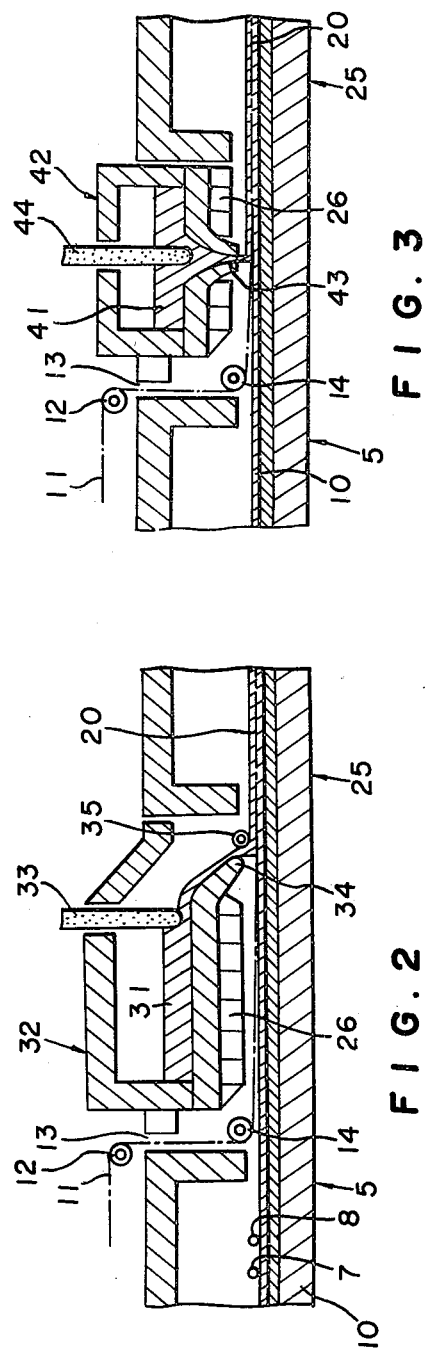

PROCESS AND APPARATUS FOR MANUFACTURING A WIRE REINFORCED FLOAT GLASS

BACKGROUND OF THE INVENTION

1. Field of the Invention

The present invention relates generally to a process for manufacturing a reinforced float glass, and more particularly, to a process for manufacturing a reinforced float glass by inserting a metal reinforcement, such as a linear metal wire or a metal wire web, in a continuous float glass ribbon.

2. Description of the Prior Art

In the industrial manufacture of a reinforced glass ribbon, two processes are generally employed. In one of these processes a molten glass is formed in a ribbon between a pair of forming rolls and a metal wire, either a linear wire or woven metal wire, is inserted into the molten glass ribbon from the rear part of the forming rolls. The other process is the so-called "sandwich process," wherein a metal wire is fed at a boding position in the step of sandwiching it between two glass ribbons by a pair of pressing rolls. In the reinforced glass manufactured by these processes, the glass surface is formed by contacting with the forming rolls, whereby the smoothness of the reinforced glass is obliged to be deteriorated. Accordingly, the glass reinforced with a metal wire is manufactured as a patterned glass wherein smoothness, flatness or parallelism can be ignored. In the manufacture of a transparent product, the patterned glass reinforced with a metal wire is polished to provide a smooth surface.

Certain processes for manufacturing glass ribbons reinforced with a metal wire which have excellent smoothness, flatness and parallelism, utilizing a float process, have been proposed. In accordance with these processes, continuous glass ribbons, in which a metal wire is inserted, are moved along the surface of a float bath, that is a molten metal bath, protected by a non-oxidizing atmosphere, whereby the surface is fire-polished to impart a finished surface as those of polished plate glasses. However, in the fire-polishing step, in order to improve smoothness of the surface of the glass ribbon, the temperature of the float bath and the time of contacting the glass ribbon with the bath are increased over certain predetermined ones so as to decrease the viscosity of the glass ribbon. As a result, a metal wire having relatively higher specific gravity than that of the glass is sedimented into the glass ribbon. Accordingly, concave parts corresponding to the metal wire are formed on the upper surface of the glass ribbon and convex parts corresponding to the metal wire are formed on the lower surface of the glass ribbon. When a glass (specific gravity of 2.5) having a thickness of about 7 mm inserting a steel wire (specific gravity of 7.9) having a diameter of 0.5 mm at the central part is floated on a molten metal bath at 950° C for 10 minutes, concave parts having a depth of about 10–20μ are formed on the upper surface of the glass and convex parts having a height of about 10–20μ are formed on the lower surface of the glass.

SUMMARY OF THE INVENTION

Accordingly, it is an object of the present invention to provide a novel process for manufacturing a reinforced float glass which can eliminate the formation of concave and convex parts caused by the difference of specific gravity of a metal wire from that of the glass.

It is another object of the present invention to provide an improved process for manufacturing a reinforced float glass having a thickness of about 6–10 mm in high quality.

The foregoing objects of the present invention have been attained by providing a process for manufacturing a reinforced flat glass which comprises the steps of continuously feeding a molten glass into a tank of a molten metal bath which is maintained in a non-oxidizing atmosphere, forming a glass ribbon by advancing the glass in a ribbon form along the molten metal bath, imparting a predetermined thickness to the glass ribbon and cooling the glass ribbon down to a temperature at which a metal wire no longer sinks, superposing the metal wire and a molten glass onto the glass ribbon, thereby forming a laminated glass ribbon embedded with the metal wire, and further advancing the laminated glass ribbon along the molten metal bath to flatten the upper surface thereof, and thereafter cooling and withdrawing it from the tank of molten metal bath.

BRIEF DESCRIPTION OF THE DRAWINGS

Other objects, features and attendant advantages of the present invention will be more fully appreciated as the same becomes better understood from the following detailed description, when considered in connection with the accompanying drawings, in which like reference numerals designate like or corresponding parts throughout the several views, and wherein:

FIG. 1 is a vertical cross-sectional view illustrating an apparatus for manufacturing a reinforced float glass in accordance with an embodiment of the present invention; and FIGS. 2 and 3 are partial vertical cross-sectional views, each showing another embodiment of the present invention.

DESCRIPTION OF THE PREFERRED EMBODIMENTS

A tank of molten metal bath used in a process for manufacturing float glass comprises a bottom structure, side walls and an upper structure, as a roof, which contains the molten metal bath, is made of a refractory material, and the molten metal bath is of tin or an alloy comprising mainly a tin component. Into the upper space thereof, a non-oxidizing inert or reducing gas, such as a mixture of nitrogen and hydrogen, is fed to prevent an oxidation of the molten metal. When the molten glass is kept without imparting any force on the molten metal bath, the thickness of the molten metal glass reaches a certain thickness under its equilibrium, decided by the mutual action of interfacial tension between the glass and the molten metal, and the gravity thereof. The equilibrium thickness is about 6–7 mm in the case of ordinary soda lime silicate glass.

In the preferred embodiment of the present invention, when a glass ribbon formed on the molten metal bath is kept at a temperature so that the glass ribbon is deformable, a certain force in the longitudinal and/or the transverse direction is applied to the glass ribbon to modify the equilibrium condition, to decrease the thickness of the glass ribbon, so as to adjust to about 2.5–4.5 mm, and preferably to about 3–4 mm in thickness. In particular, it provides top rolls which have cylindrical ends made of graphite or heat resistant metal, having sprockets, and are rotated by contacting with the upper surface of both edges of the glass ribbon. In such case, the rotary shaft of the top roll is slanted in a desirable angle to the advancing direction of the glass ribbon, whereby the tractive force, having transverse direction and longitudinal direction components, can be applied at both edges of the glass ribbon so as to control the thickness of the glass ribbon to a desirable value under maintaining the width thereof. Then the glass ribbon is gradually cooled to the condition of temperature and viscosity to prevent sinking of a metal wire by gravity, when the metal wire is placed on it to provide a reinforced float glass.

The metal wire and the molten glass are continuously superposed onto the glass ribbon to form a laminated glass ribbon embedded with the metal wire. In the preferred embodiment of the invention, it is desirable to control the temperature of the glass ribbon to lower than 800° C and preferably 500°–750° C, so as not to allow the metal wire to sink. When the metal wire is placed on the glass ribbon, in practice, the roll rotating near the glass ribbon is disposed across the glass ribbon, and the metal wire is supplied from above to a gap between the roll and the glass ribbon so as to superpose the metal wire onto the surface of molten ribbon.

The roll is made of a heat resistant metal, such as stainless steel, or graphite, boron nitride, or the like. The metal wire is linear or a net metal wire made of mild steel, 13 Cr stainless steel, 18–8 Cr stainless steel, aluminum-containing chromium steel, or the like.

The molten glass is supplied on the glass ribbon after superposing the metal wire or at the same time, and it is usually supplied in a layer form or a ribbon form so as to form a laminated glass ribbon embedded with the metal wire. In this case, the thickness of the upper glass layer is about 4.5–2 mm, and preferably 3.5–2.5 mm. The thickness of the laminated one is preferably 6–8 mm.

It is preferable to maintain the molten glass at a temperature higher than 1000° C and preferably about 1150°–1300° C, whereby the smoothness of the upper surface can be improved.

The laminated glass ribbon embedded with the metal wire is further advanced along the molten metal bath so as to gradually cool it and is then taken out from the tank.

The case of manufacture of a metal wire reinforced glass having a thickness of 6–8 mm has thus been described. When a glass ribbon having a thickness of about 10 mm is manufactured, a glass ribbon having a thickness of 4–6 mm is preliminarily formed and then the metal wire is superposed on it and a glass layer having a thickness of 6–4 mm is laminated.

Referring now to the drawings, the invention will be illustrated. More particularly, in FIG. 1, the molten glass 1 is supplied from a first forehearth 2 of a glass melting furnace, not shown. The flow rate of the molten glass 1 is controlled by a weir 3 and then the molten glass is fed from a spout lip 4 to the front part of a molten metal bath tank 5. The tank 4 comprises a bottom, side walls and an upper structure in a longitudinal shape and has a molten metal bath 6 disposed therein. At the upper space of the tank, a non-oxidizing gas is supplied so as to prevent oxidation of the metal bath. The glass supplied on the surface of the molten metal bath 6 is spread near the inlet of the tank, so as to form a glass ribbon 10. The thickness of the molten glass ribbon is maintained by two pairs of top rolls 7 and 8 which are rotated, contacting with both edges of the molten glass ribbon, and are disposed in slanting relation to the advancing direction of the glass ribbon. The thickness of the glass ribbon is decreased by imparting tractive force to the slant direction to give a thickness of 3–4 mm.

A metal wire 11 is superposed onto the glass ribbon 10 at 500°–750° C temperature of the glass ribbon. The metal wire 11 is passed through a first guide roll 12 disposed above the upper structure of the tank and is fed through a gap 13 for feeding the metal wire, which is formed in the upper structure of the tank, into the tank. The metal wire is superposed onto the surface of the glass ribbon by a second guide roll 14 made of graphite which is rotated near the glass ribbon 10.

A second forehearth 22 is disposed at the middle part of the tank. Molten glass 21 is laminated on the glass ribbon 10 and the metal wire 11 by passing through a weir 23 and a spout lip 24. It is suitable to keep the temperature of the molten glass 21 at 1150°–1300° C. The thickness of the upper glass layer laminated is preferably in a range of 2.5–3.5 mm and the thickness of the laminated glass layer is preferably controlled to about 6–8 mm. The reference 26 designates a supporting structure of the second forehearth 22.

The laminated glass ribbon 20 is moved on the surface of the rear molten metal bath tank 20 so as to form a smooth and flat surface. In the rear bath tank 25, it is preferable to provide a cooler and/or a heater in the bath or in the upper space of the bath so as to control the temperature of the glass ribbon and/or the metal bath. The glass ribbon 20 is gradually cooled to the temperature of about 600°–650° C near the outlet of the tank and then it is moved by the conveyor roll 9 to the annealing step.

In the above-mentioned embodiment, the spout lip 24 of the second forehearth 22 is disposed to be opposite to the forward direction of the glass ribbon. As shown in FIG. 2, however, in another embodiment, the spout lip 34 of the second forehearth 32 can be disposed in the forward direction of the glass ribbon. The reference 31 designates the molten glass, 33 designates a weir and 35 designates a roll for tightly compressing the molten glass fed from the second forehearth 32 to the lower glass ribbon, which is preferably cooled with water and is made of a heat resistant metal or graphite.

In the embodiment of FIG. 3, a slit 43 is formed at a middle part of the second forehearth 42. The molten glass 41 is flowed down from the slit to the float glass ribbon 10 so as to be laminated. In this case, a damper 44, made of a refractory material, is vertically movable upwardly and downwardly so as to control the flow rate of the molten glass.

Obviously, many modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A process for manufacturing a reinforced float glass which comprises the steps of:
   feeding a molten glass continuously into a tank of a molten metal bath maintained in a non-oxidizing atmosphere;
   forming a glass ribbon by advancing the molten glass in a ribbon form in contact with the molten metal bath;
   imparting a predetermined thickness to the glass ribbon;

cooling the glass ribbon down to a temperature at which a metal wire will no longer sink;

superposing a metal wire and a molten glass onto the glass ribbon, thereby forming a laminated glass ribbon embedded with the metal wire;

further advancing the laminated glass ribbon along the molten metal bath to flatten the upper surface thereof; and cooling and withdrawing the laminated glass ribbon from the tank of the molten metal bath.

2. The process according to claim 1, wherein the glass ribbon formed on the molten metal bath is cooled to a temperature not higher than 800° C before the metal wire and the molten glass are superposed on the glass ribbon.

3. The process according to claim 1, wherein the molten glass to be superposed on the glass ribbon has a temperature not lower than 1000° C.

4. The process according to claim 1, wherein the laminated glass ribbon embedded with the metal wire is composed of an upper glass layer of 2–4.5 mm thickness and a lower glass layer of 4.5–2 mm thickness.

5. An apparatus for manufacturing a reinforced float glass which comprises:

a tank containing a molten metal bath in which is maintained a non-oxidizing atmosphere over the bath;

a first forehearth provided with a spout lip, from which molten glass is fed onto the molten metal bath to form a glass ribbon;

traction means for imparting a predetermined thickness to the glass ribbon by applying a transverse tractive force to both edges of the glass ribbon;

metal wire feeding means for superposing a metal wire onto the glass ribbon; and a second forehearth provided with a spout lip, from which a molten glass is superposed onto the glass ribbon to form a laminated glass ribbon embedded with the metal wire.

6. The apparatus according to claim 5, wherein said metal wire feeding means includes a first guide roll provided in the upper structure of the tank for guiding the metal wire into the tank through a slit provided in the upper structure of the tank and a second guide roll rotating in the vicinity of the glass ribbon for guiding the metal wire to the point where the metal wire and the molten glass fed from the second forehearth are superposed onto the glass ribbon.

* * * * *